Feb. 13, 1923.

J. LAKE, JR 1,445,440

MOTOR CYCLE ATTACHMENT

Filed Sept. 16, 1922

James Lake, Jr. INVENTOR

BY
Philip S. McJ... ATTORNEY

Patented Feb. 13, 1923.

1,445,440

UNITED STATES PATENT OFFICE.

JAMES LAKE, JR., OF BROOKLYN, NEW YORK.

MOTOR-CYCLE ATTACHMENT.

Application filed September 16, 1922. Serial No. 588,737.

*To all whom it may concern:*

Be it known that I, JAMES LAKE, Jr., a citizen of the United States, and a resident of Brooklyn, Kings County, and State of New York, have invented certain new and useful Improvements in Motor-Cycle Attachments, of which the following is a specification.

In the present-day machines, the speedometer is usually driven from the rear wheel of the motorcycle, through a pinion at the end of the flexible speedometer cable in mesh with a gear carried by the wheel and the fixture which carries the pinion at the end of the cable is supported by a clamp applied to the frame of the machine. This method of support provides for convenient adjustment of the pinion with respect to the driving gear, but means that each time the wheel is adjusted in the forks of the frame for taking up slack in the drive chain and the like, the fixture carrying the speedometer pinion has to be adjusted accordingly.

One of the principal objects of my invention is to eliminate this need for adjusting the speedometer drive each time the wheel is adjusted or shifted in any way.

Other objects of the invention will appear as the specification proceeds.

In the drawing accompanying and forming part of this specification, I have illustrated an embodiment of the invention, wherein the desired objects are attained by combining the speedometer gearing with the brake band support of the wheel so that such gearing becomes a unitary part of and is adjustable with the wheel itself.

In this drawing Figure 1 is a broken side elevation illustrating the application of the invention to the rear wheel of a motorcycle.

Figure 1:
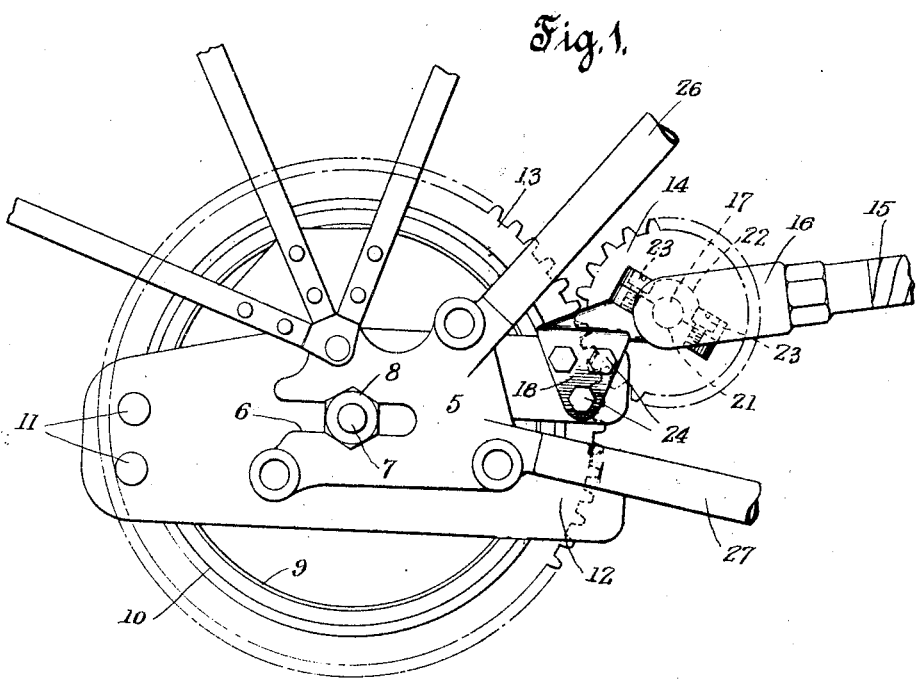
Figure 3:
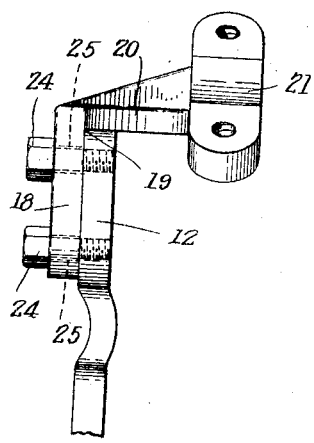
Figure 3 is an end view of the body portion of this bracket as attached to the brake band support.
Figure 2:
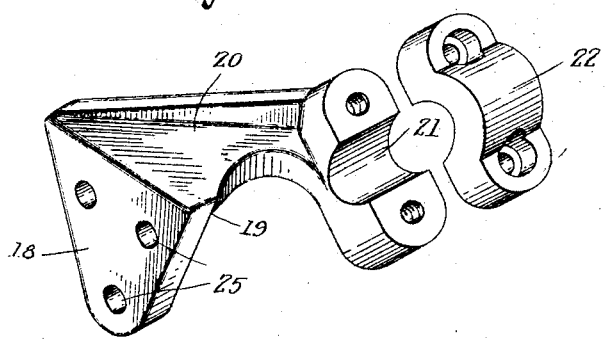
Figure 2 is a detached perspective view of the cable end supporting bracket.

One of the rear forks of the motorcycle frame is shown at 5 in Figure 1, the same being of more or less conventional construction, slotted at 6 to take the axle 7 of the wheel, which axle is held adjustably and removably at its opposite ends in the forks by suitable securing devices such as clamp nuts 8. The wheel is journaled in suitable fashion on the axle and carries in the present disclosure, a brake drum 9 with which cooperates a brake band 10, actuated by suitable mechanism, not shown. The brake band is made in two segments pivoted at 11 on a supporting plate 12 which is carried by and forms a unitary part of the wheel structure, being carried, for instance, by one of the wheel bearings.

The speedometer drive, in the instance illustrated, comprises a gear 13 carried by the road wheel in mesh with a pinion 14 at the end of the speedometer cable 15. This cable end is shown as of conventional construction, involving a housing 16 having an angularly extending spindle 17 at one side providing a bearing for the end of the flexible shafting which carries the pinion.

To maintain the driving relation between the speedometer gears irrespective of the adjustment or removal of the wheel structure, the end fixture of the cable, carrying the pinion, is supported directly upon and carried by the brake band support 12. For this purpose there is provided a bracket of special construction having a flat base portion 18 for application to the side of the supporting plate 12, and an angularly related overstanding top portion 19 engageable over the upper edge of the plate, said top portion being extended as an angularly projecting lateral arm 20 terminating in an open bearing 21 for the fixture spindle. This bearing is closed and the spindle is held rotatively and longitudinally adjustable therein by a cap 22, removably secured in place as by means of screws 23.

This pinion and cable supporting bracket is thus fitted to the side and upper edge of the brake band support and may be removably and adjustably secured in position thereon as by screws 24 passed therethrough into the side of the support. Three triangularly related screws may be employed with the apex of the triangle at the lower end of the bracket, the bracket being correspondingly shaped. This enhances the appearance of the bracket and at the same time provides the necessary rigidity and strength. By enlarging the holes 25 for the screws or elongating them somewhat, a certain amount of adjustment of the bracket on the support may be provided for to take up wear and insure a proper mesh of the gears.

The front end of the brake band support to which the speedometer bracket is applied projects in between the upper and lower rear frame bars 26 and 27 so that the bracket is out of the way and partially protected by the frame and the bracket is preferably attached at the extreme forward end of the supporting plate so as to allow for the maximum adjustment of the plate which ordinarily stands at the inside of the fork, as illustrated. The laterally extending arm or inwardly offset portion of the bracket supports the spindle at the end of the speedometer cable at a point closely adjacent to the pinion and so holds the pinion firmly engaged with the driving gear.

The construction described, it will be seen, causes the speedometer gearing to remain constantly in mesh, irrespective of adjustments of the road wheel within the frame, the pinion moving as a unit with the wheel when the latter is adjusted for the purpose of taking up slack in the drive chain and the like. This construction also permits of a relatively light and small attaching bracket being used, which is of simple construction and can be produced quite inexpensively.

By means of the present improvements also the speedometer fixture is supported within the frame and hence is protected by the frame against injury in case of overturning or other accident to the machine, and further, if the frame should become bent or sprung, this will not affect the speedometer gearing because of its mounting independently of the frame.

What I claim is:

1. In a motorcycle, the combination with the frame and the drive wheel carrying a speedometer gear, said drive wheel being mounted adjustably in the frame for the purpose of varying the driving connection thereto and carrying with it the brake band support in such adjustments, of a speedometer pinion supporting device carried by said brake band support and arranged to hold the speedometer pinion constantly in mesh with the speedometer driving gear on the wheel, irrespective of the adjustments of the wheel in the frame.

2. In combination, a frame forked to adjustably receive a drive wheel, a drive wheel engaged in the forks and adjustable within the frame for the purpose of varying the tension of the driving connection, a speedometer gear on said wheel, a brake support inside the frame and carried by the drive wheel in its various adjustments within the frame and a bracket attachable to said brake support provided with means for supporting a speedometer cable end fixture whereby said speedometer fixture will be protected by the frame and will be shifted with the adjustment of the drive wheel within the frame so as to maintain a constant driving relation between the pinion end of the fixture and the drive gear therefor carried by the wheel.

3. The combination with a motorcycle frame and a road wheel adjustably and removably mounted therein and carrying with it a brake band support, of a bracket detachably applied to and directly carried by said brake band support and provided with means for detachably holding a speedometer cable end fixture.

4. As an article of manufacture, a bracket provided with means for holding the end fixture of a speedometer cable and having a base with angularly related side and end walls to fit against the side and over the edge of the brake band support of a motorcycle wheel, said base having means for detachably securing the same to such brake band support.

5. As an article of manufacture, means for supporting a speedometer cable end in permanently driven relation to a cycle wheel comprising a bracket having a base with angularly related side and end walls to fit against the side and over one edge of the brake band supporting plate of a cycle wheel and having a cable end fixture holding clamp angularly offset to one side of said base to support the cable end fixture offset laterally to one side of the brake support.

6. In combination with a motorcycle wheel having a brake band supporting plate at one side of the same, of a bracket attached to the inner end of said plate forward of the axle of the wheel and having a laterally extending inwardly offset support for holding the pinion of a speedometer cable in mesh with a drive gear carried by the wheel.

7. In a speedometer drive for motor vehicles, the combination with a wheel carrying a brake drum and a brake band support associated with said wheel, of a speedometer cable end fixture and a support for said cable fixture mounted on and carried by the brake band support.

8. In combination, a motorcycle frame having upper and lower rear frame bars, a drive wheel adjustable within the frame for properly tensioning the chain or other driving connection therefor and, carried with it in such adjustments, a brake band supporting plate extending toward the space between the upper and lower rear frame bars aforesaid and a bracket on said brake band supporting plate provided with means for supporting a speedometer cable end fixture within the space between the upper and lower rear frame bars and whereby said speedometer fixture will be shifted with the adjustment of the drive wheel and will be protected by said upper and lower rear bars of the motorcycle frame.

In witness whereof, I have hereunto set my hand this 12th day of September, 1922.

JAMES LAKE, Jr.